US006773637B1

(12) United States Patent
DiSalvo et al.

(10) Patent No.: US 6,773,637 B1
(45) Date of Patent: Aug. 10, 2004

(54) COMPOSITION FOR INDICATING THE PREVAILING TEMPERATURE

(75) Inventors: Gail D. DiSalvo, 127 Rippling Brook Way, Bernardsville, NJ (US) 07924; John Cusick, P.O. Box 704, Brant Rock, MA (US) 02020

(73) Assignees: Gail D. DiSalvo, Bernardsville, NJ (US); John Cusick, Brant Rock, MA (US)

( * ) Notice: Subject to any disclaimer, the term of this patent is extended or adjusted under 35 U.S.C. 154(b) by 0 days.

(21) Appl. No.: 09/563,158

(22) Filed: May 1, 2000

(51) Int. Cl.$^{7}$ .......................... G02F 1/00; G01N 31/00; G01K 11/00

(52) U.S. Cl. ...................... 252/583; 252/586; 252/962; 252/408.1; 374/162

(58) Field of Search ................................ 252/583, 586, 252/962, 408.1; 374/162

(56) References Cited

U.S. PATENT DOCUMENTS

| | | | | | |
|---|---|---|---|---|---|
| 3,723,349 | A | * | 3/1973 | Heseltane et al. | 252/583 |
| 3,816,335 | A | * | 6/1974 | Evans | 252/583 |
| 4,299,727 | A | * | 11/1981 | Hof et al. | 252/408.1 |
| 4,457,252 | A | * | 7/1984 | Manske | 116/216 |
| 4,468,137 | A | * | 8/1984 | Hilsum et al. | 374/160 |
| 4,717,710 | A | * | 1/1988 | Shimizu et al. | 252/962 |
| 4,829,539 | A | * | 5/1989 | Angus et al. | 374/159 |
| 4,892,677 | A | * | 1/1990 | Preziosi et al. | 252/408.1 |
| 5,215,378 | A | * | 6/1993 | Manske | 374/105 |
| 5,254,473 | A | * | 10/1993 | Patel | 436/1 |
| 5,490,956 | A | * | 2/1996 | Kito et al. | 252/583 |
| 5,558,700 | A | * | 9/1996 | Shibahashi et al. | 252/583 |
| 5,695,284 | A | * | 12/1997 | Waters | 374/162 |
| 5,721,059 | A | * | 2/1998 | Kito et al. | 252/583 |
| 5,730,908 | A | * | 3/1998 | Nodari et al. | 252/583 |
| 5,779,364 | A | * | 7/1998 | Cannelongo et al. | 374/160 |
| 5,788,375 | A | * | 8/1998 | Parker et al. | 374/162 |
| 5,857,776 | A | * | 1/1999 | Blixt et al. | 374/106 |
| 6,084,702 | A | * | 7/2000 | Byker et al. | 252/583 |

* cited by examiner

*Primary Examiner*—Philip C. Tucker

(57) ABSTRACT

The present invention is directed to a thermochromic temperature sensitive composition used to detect the prevailing temperature, and particularly, to detect when the temperature is within a particular range. When the temperature is within that range, the composition undergoes a color change that is visible to the observer.

5 Claims, No Drawings

COMPOSITION FOR INDICATING THE PREVAILING TEMPERATURE

FIELD OF THE INVENTION

The present invention is directed to a thermochromic temperature sensitive composition used to detect the prevailing temperature, and particularly, to detect when the temperature is within a particular range. When the temperature is within that range, the composition undergoes a color change that is visible to the observer.

BACKGROUND OF THE INVENTION

Though compositions which provide an indication of the prevailing temperature are known in the art, and exemplary compositions are described below, these compositions have not shown themselves to be satisfactory in all instances, and in any event, there is always a need to improve over the existing compositions, and to simplify the way in which they operate. For instance, known devices may be of a relatively complicated assembly or construction, in that the material which provides the physical indication of the prevailing temperature, which ordinarily may be a dye or pigment, is isolated in a compartment contained within the housing of the device. Also, the dye or pigment may not be temperature sensitive (thermochromic) per se, in that the material may change color based upon the change in another physical parameter, such as pH. Another drawback is that the devices, by virtue of the indicating material, may indicate only a given temperature, which may not be the temperature range desired by the end user.

The present invention seeks to rectify these shortcomings.

DESCRIPTION OF THE PRIOR ART

U.S. Pat. No. 5,857,776 discloses a method and a device for monitoring the handling conditions of at least one object intended to be handled under certain predetermined conditions. The temperature or the temperature as a function of time of at least one object, is monitored to enable it to retain as much as possible of its original quality. To this end, a device is inserted into the object, or between two objects in a stack of objects, including a substantially flat, elongate casing, having a slot-shaped space between two opposed walls of the casing. An elongate slide-shaped body removably inserts into the slot-shaped space of the casing. At one end the slide-shaped body is provided with a technique for indicating, by color change, the absence or presence of predetermined conditions. The color change is thereafter observed visually by withdrawing the body that is removably inserted in the slot-shaped space of the casing. During the visual observation, the color may be suitably compared with a color scale on the slide-shaped body. Also, the casing of the device may be perforated at one end. Furthermore, at least the portion of the inside of the casing contacting the means when inserted in the casing, may be suitably provided with ridges extending in the longitudinal direction of the casing. The device includes a temperature sensitive composition which undergoes a pH shift upon freezing.

U.S. Pat. No. 5,788,375 discloses a floating cooking indicator, comprising first and second layers with a thermochromic material disposed therebetween, the first layer being transparent to permit viewing of the thermochromic material and the second layer including a plastic material with lower density particles dispersed therein.

U.S. Pat. No. 5,779,364 discloses a temperature indicator utilizing waxes, low-temperature melt metals or polymers attached to a support member that will melt to reveal a visible indicia on the support member thereby serving as an indicator that the product container to which the invention is attached has been heated beyond a predetermined stable temperature of the product.

U.S. Pat. No. 5,695,284 discloses a thaw indicator unit for sensing and permanently recording a thawing experienced by a temperature sensitive food or other item. The unit has a container of transparent, non-toxic material with a hermetically sealed chamber containing a frozen color change medium having at least two segments of differently colored frozen aqueous compositions, the segments being juxtaposed along an interface of molecular thickness, and at least one of the segments being substantially homogeneously colored differently from at least one juxtaposed other colored segment, wherein the colorants are food grade materials, and whereby the unit when placed on, in or in close proximity to the item will record any first thawing by way of thawing of the juxtaposed segments and intermixing thereof at least at the interface thereof to produce at least a visible section of an intermix of said compositions and having a markedly different and readily visible color from that of the juxtaposed segments.

U.S. Pat. No. 5,254,473 discloses an indicator composition and process capable of changing color in relationship to its exposure to a temperature above and below a base line temperature and to the time of the exposure. The indicator is deposited as a layer on the substrate, which comprises a dispersion of either a binder comprising a reaction inert, neutral finely divided absorbent, in the presence of a reactant comprising a salt of an acid or an organic compound substituted by at least one moiety which, in ionic form, is an anion or a binder/reactant, comprising at least one solid organic polymer whose constituent units contain, as a covalent substituent, at least one moiety which, in ionic form, is an anion. The indicator composition is at least one acid sensitive pH dye. The activator is at least one base. This composition and process may be utilized to form a solid state device for monitoring integral values of time and temperature during storage of perishables.

U.S. Pat. No. 5,215,378 discloses a dual temperature indicator providing visual indications when exposed to predetermined high or low temperatures. The indicator has a bulb with a capillary tube and an attached high temperature indicator structure. The bulb has a first liquid which also fills a predetermined portion of the tube. A separating substance and a second miscible liquid further fills a predetermined portion of the remainder of the tube. At a predetermined low temperature, the liquid in the bulb contracts causing the separating substance and a portion of the second liquid to move into the bulb to produce a visible color change. The high temperature indicator structure has an indicating member in contact with the capillary tube end and which provides a visual indication at a predetermined high temperature when the liquids expand upon an environmental temperature increase.

U.S. Pat. No. 4,892,677 discloses a process for producing articles useful in monitoring the time-temperature history of perishable items. The process initially involves forming a solution comprised of a diacetylenic monomer and a solvent. The solution is frozen, and the frozen solution having crystalline diacetylenic monomer therein is irradiated to partially polymerize the diacetylenic monomer. Partial polymerization of the crystalline diacetylenic monomer admixed with frozen solvent results in the production of a novel article of manufacture having color. The novel article of manufacture is comprised of frozen solvent, diacetylenic monomer, and colored polydiacetylene. Due to the intensity of the color of the polydiacetylene, the entire article of manufacture appears to be colored. The colored article of manufacture may be attached to various perishables to monitor the shelf fife of the perishables. Upon exposure to temperatures above a critical temperature, the frozen solvent melts and extracts unreached monomer from the colored polymer, thereby causing a sharp color transition which indicates that the perishable should possibly be discarded.

U.S. Pat. No. 4,829,539 discloses a temperature indicating device which comprises a plurality of panels in a fixed array. Some of the panels are adapted to undergo a reversible change in appearance at a given temperature whereas the remainder are adapted to undergo irreversible change in appearance at a given temperature. The device is useful in indicating the temperature of an object as well as its actual temperature.

U.S. Pat. No. 4,468,137 discloses a temperature indicating device comprising a series of liquid crystal cells each of which contains a liquid crystal material having a different composition, the composition varying from cell-to-cell, and each of which cells exhibits the grandjean state whereby temperature is indicated by iridescence of the cells, the cells being such that the liquid crystal material in each has a clearing point at a different selected temperature in a series of temperature in a temperature range of interest and that each of the cells is such that its liquid crystal material does not revert immediately to the grandjean state on cooling from the isotropic liquid state wherein the improvement comprises the cells having a construction such that the liquid crystal material of each cell undergoes, on cooling from the isotropic liquid state, the transition isotropic liquid state to focal conic state, without reverting immediately to the grandjean state.

U.S. Pat. No. 4,457,252 discloses a critical temperature indicator utilizing the volume reduction characteristics of organic compounds as they undergo a change from the liquid state to the solid state. The bulb and a portion of the capillary tube of a thermometer-like structure contains a colorless organic compound. Another organic compound saturated with a dye, which compound has a solidification temperature lower than that of the colorless compound and which is miscible with the colorless compound, is located in the capillary tube and separated from the colorless compound by a solid, movable plug or a liquid which is immiscible with either the colorless or the dyed compound. The volume of the colorless compound upon solidification is less than the volume of the bulb so that the separating plug or liquid and at least a portion of the dyed compound are drawn into the bulb upon solidification. The dyed compound then mixes with the colorless compound to provide a visual indication that the colorless compound has solidified.

U.S. Pat. No. 4,299,727 discloses a disposable, reversible thermometer. The thermometer comprises (1) a suitable heat-sensitive composition; (2) a suitable matrix-forming amorphous material; and (3) a suitable film-forming material that is more crystalline than the matrix-forming amorphous compound.

SUMMARY OF THE INVENTION

The principle object of the present invention is to provide a temperature sensing composition that provides visual indication of the temperature in the prevailing environment.

It is a further object to provide a temperature sensing composition that is relatively simple to construct and use.

It is a further object of the invention to provide a temperature sensing composition that possesses a unitary construction.

The invention is a temperature sensing composition comprised of a thermochromic dye, which is dispersed or dissolved in a plastic resin. The resin can be a thermoset such as an epoxy, a polyurethane, a phenolic or other thermoset, or it can be a thermoplastic such as polyethylene, polypropylene, a polyvinyl chloride, a polyester or other thermoplastic. The temperature sensing dye changes from colorless to a deep color as the temperature falls below 45 degrees Fahrenheit. The exact temperature of change can be anywhere between 35 and 45 degrees Fahrenheit depending on the specific thermochromic dye that is used. As described herein, it should be understood that the composition is non-discreet, or in other words, the composition is of an integral construction, as the thermochromic dye is dispersed in the resin.

The invention can be used as an indicator that indicates when the temperature of a refrigerator or other food storage container rises above 40 to 45 degrees Fahrenheit, which is the optimum temperature range for storage of food. The material can be applied to a painted or unpainted plastic, ceramic, glass or metal substrate which is then placed in the refrigerator. Alternatively, the material can be applied directly to the refrigerator wall or shelf. It can also be applied to the refrigerator as a magnetic strip.

The invention can also be used with outdoor faucets and valves to indicate that the freezing point is approaching. For instance, it can be applied directly to the valve or faucet, or the material can be coated on a metal, ceramic, glass or plastic substrate, which can be attached to the valve or faucet. In a further embodiment, the present invention is constructed as a flange that is affixed to the exterior of attached to the outside of an outdoor faucet and notifies the observer whether water in the line is approaching the freezing point. The material can also be used as a warning method for bridge surfaces or airplane wings, which are subject to freezing temperature in cold weather. The material can be applied directly to all or a part of the bridge or wing structure or surface, or it can be coated on a metal, ceramic, glass or plastic substrate to provide a visible warning device. The material serves as an alert to the approach of freezing of the bridge or wing surface. The device could also be used by farmers or the like to sense and warn of oncoming frost or other cold temperatures that could damage crops.

It has been observed that the present invention can sense the differences in the temperature of air currents that flow over the device, and thus is very sensitive to temperature differentials. Specifically, a wave-like pattern visible as a transient color change that flows across the body of the device has been observed when the air current flowing over the device has a temperature above or below 42° F. This indicates that the device is capable of indicating the prevailing temperature in localized regions, with satisfactory degree of precision.

None of the temperature indicators disclosed in the prior art references cited above provide a means for sensing temperatures as disclosed in the present invention in which a thermosensitive, (i.e.—thermochromic) dye is dispersed in a matrix forming resin material. When a particular threshold temperature is reached, the dye component undergoes a reversible color change, that is visible in the temperature sensing composition, informing an observer of a pending temperature change.

DETAILED DESCRIPTION OF THE PREFERRED EMBODIMENT

With the temperature sensing compositions contemplated by the present invention, either a thermoset or thermoplastic base resin can be used as the matrix-forming material. Thermoplastics such as polyethylene, polypropylene, a polyvinyl chloride, and polyesters can be used. Thermosets such as polyurethane, phenolics or other thermosets can be used as well. The temperature sensing compositions may be used as a coating which is applied to the surface of a substrate and allowed to cure or dry. The coating system can be solvent-based or neat. The an solvent can be organic or inorganic. If the thermochromic dye is added to a thermoplastic resin the composition maybe used as a temperature sensing plastic.

The thermochromic dye can be dispersed into suitable resins such as unmodified epoxies PVC, ABS, or coatings that may be formed by dispersing the dyes into varnishes and coatings, such as polyurethane clear coatings. Suitable additives such as hardeners and diluents may also be used as needed to improve or enhance one or more property of the thermochromic compositions. Thermochromic dyes suited for use in the present invention include the following: thermochromic powder LD-P, red no. 058TC, Dyancolor Red Poster Screen Ink, thermochromic powder no. 058C8T. Source information is provided in the following examples. These thermochromic dyes have been demonstrated to change color in response to temperatures within the range of 40° to 45° F.

In preparing the thermochromic temperature sensing compositions of the present invention, the dyes are dispersed into the matrix-forming materials and mixed to achieve homogeneity, a process which usually takes a few minutes. The dispersion can be mixed by hand or by machine, such as a blender. After the coatings have been formulated, they may be applied to the surface of a substrate as a coating and allowed to cure or dry.

The following examples are illustrative of the present invention.

EXAMPLE 1

A general purpose unmodified epoxy resin such as ARALDITE GY 6010 from Ciba Specialty Products of Brewster, N.Y. was placed in a container and a modified polyamide-amine hardener (Hardener HY 283 from Ciba Specialty Products) was added to it. The resin and hardener were mixed at room temperature to achieve homogeneity throughout. To the amine and epoxy resin mixture at room temperature were added 27.1 grams of Thermochromic Powder, LD-P, Red, #058TC from Color Change Corporation of Addison, Ill. The powder is mixed to achieve a homogeneous viscous mixture, which is applied to a surface by brushing, troweling or dipping.

The resins used in this example were chosen to give a liquid mixture with a viscosity and pot life suitable for coating a metal, plastic or other surface easily. The GY 6010 and HY 283 are a common coating resin system used in maintenance and marine coatings on pipes, bridges, floors and other industrial or consumer equipment. The resin could be any epoxy resin or mixture of epoxy resins. The amine hardener could be an amine hardener or any other hardener (anhydride, mercaptan, etc.) suitable for curing the chosen epoxy resin.

The ratio between the ingredients is chosen to give a pot life of 24 hours to allow sufficient time for coating of the substrates. Other ratios of resin and hardener could also be used which would have different pot life (longer or shorter).

The thermochromic dye is specially chosen to give a temperature range of reaction between 41° F. and 46° F. (5° C. and 8° C.). This dye (no. 05C8T) is commercially available from the Color Change Corporation of Addison, Ill. The amount of thermochromic dye used in the above example is 2% of the total resin and hardener mixture, but anywhere from 0.5% to 10% can be used. A level of 2% was found sufficient to give a suitable depth of color for the temperature change to be very visible. Levels higher than 10% would be uneconomic and unnecessary, but would still produce the required color change at the required temperature.

A thin film of the viscous liquid mixture of resin, hardener and thermochromic dye was applied to an aluminum coupon and allowed to stand at room temperature overnight. The resin and hardener mixture with the dye forms a hard film on the aluminum coupon. The coating on the coupon is colorless at room temperature. On cooling the coated coupon to 45 degrees Fahrenheit the color of the coated coupon starts to change and at 43 degrees Fahrenheit it becomes a deep red which remains as long as the coupon temperature is kept below 43 to 45 degrees Fahrenheit. On warming the coupon to above 45 degrees Fahrenheit the color of the coupon goes back to colorless. The color change is completely reversible any number of times the temperature moves in and out of this range.

The mixture made above was troweled onto the surface of an outdoor faucet flange and allowed to cure overnight. The coated flange was put into the refrigerator and allowed to come to a temperature of 43 degrees Fahrenheit. The coated areas of the flange turned a deep apple red. On removal from the refrigerator the coated areas of the flange became colorless. The coated flange was put outdoors and tested every 30 days for 6 months. The coated areas of the flange continued to turn a deep red on exposure to below 45 degree Fahrenheit temperature and to lose the color on exposure to temperature above 45 degrees Fahrenheit.

EXAMPLE 2

A brass coupon, one inch wide by two and one-half inches long was coated with Dynacolor Themochromic Red Poster Screen Ink from Chromatic Technologies, Inc. of Colorado Springs, Colo. and allowed to dry at room temperature. The coated coupon, a light pink in color was put in a jar of water and the temperature of the water was lowered from room temperature by the addition of ice. When the temperature reached 42 degrees Fahrenheit, the color of the coated coupon began to darken to deep pink. At 40 degrees Fahrenheit the color of the coupon changed to a red color very distinct from the color seen at room temperature and above 42 degrees Fahrenheit. When the coupon was allowed to rise in temperature above 42 Fahrenheit the color began to change and it became light pink after reaching 45 Fahrenheit. The coupon was placed in the refrigerator where it promptly turned a deep red. On removal from the refrigerator the coated coupon immediately began to lose the red color. On being put back in the refrigerator it again turned red showing the reversible nature of the color change.

EXAMPLE 3

A coating system was made from Color Change Corporation Thermochromic powder #058C8T and a polyurethane clear coat finish. The coating was applied to a brass strip and allowed to dry at room temperature. The coating formed a colorless dry film on the brass strip. On exposure to temperature below 45 degrees Fahrenheit the coated area of the strip began to change in color and become a deep red at 42 to 43 degrees Fahrenheit. On increasing the temperature of the coated strip to above 45 degrees Fahrenheit the coated strip lost the color and became colorless again. The coated strip could be could be changed in color repeatedly on change of the temperature to above or below 45 degrees Fahrenheit.

EXAMPLE 4

A formulation was made from 16.2 grams of ARALDITE GY 60610 epoxy resin and 1.0 grams of ARALDITE DY 025 epoxy diluent. The diluent was added to adjust the viscosity of the resulting mixture for easy coating. The epoxy mixture was then mixed with 11.3 grams of Hardener HY 283 amine hardener. To this mixture of epoxies and amine hardener was added 0.3 grams of Color Change Corporation Thermochromic Dye #05C8T. The homogeneous mixture was poured onto a sheet of aluminum foil and allowed to cure over night. The resulting coated aluminum foil was cut into strips and tested for color change. The coated aluminum strips were put into a 42 degree Fahrenheit refrigerator and allowed to cool to 43 degrees F. The coated aluminum strips turned a deep red. On removal from the refrigerator the coated areas of the aluminum strips returned to the colorless state. A second formulation with 1.28 grams of the thermochromic dye was made and coated on the aluminum foil. There was no difference in the temperature of color change or the intensity of the color on temperature change.

We claim:

1. A non-discreet temperature sensitive composition providing a visual indication of a prevailing temperature within the range of 40° F. to 45° F., comprised of from about 0.50% to about 10% of a thermochromic dye dispersed within from about 90% to about 99.5% of a hardened matrix forming thermoset resin wherein the dye undergoes a color change when the prevailing temperature enters the range of 40° F. to 45° F., and which reverses the color change after reaching 45° F.

2. The thermosensitive composition of claim 1 further comprised of a hardener or a diluent.

3. The composition according to claim 1 wherein the composition is useful to indicate when the temperature of a refrigerator rises above 45 degrees Fahrenheit.

4. The composition according to claim 1 wherein the composition is useful with outdoor faucets to indicate that freezing temperatures are approaching.

5. A method of indicating the temperature inside of a refrigerator comprising:

placing a composition according to claim 1 in the refrigerator.

* * * * *